(12) United States Patent
Kobayashi (10) Patent No.: US 6,272,114 B1
(45) Date of Patent: Aug. 7, 2001

(54) DATA PROCESSING APPARATUS/METHOD AND ELECTRONIC APPARATUS WITH SUCH APPARATUS/METHOD

(75) Inventor: Takashi Kobayashi, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/021,268

(22) Filed: Feb. 10, 1998

(30) Foreign Application Priority Data

Feb. 14, 1997 (JP) .................................................... 9-030285

(51) Int. Cl.⁷ ........................................................ H04J 3/24
(52) U.S. Cl. ........................ 370/257; 370/474; 370/475; 709/221
(58) Field of Search ..................................... 370/395, 468, 370/474, 476, 498, 254–257, 457, 475; 710/30, 60, 100, 106; 340/825.52, 825.53; 709/220–222

(56) References Cited

U.S. PATENT DOCUMENTS

| | | | |
|---|---|---|---|
| 5,563,886 | * 10/1996 | Kawamura et al. | 370/475 |
| 5,583,997 | * 12/1996 | Hart | 709/218 |
| 5,615,404 | * 3/1997 | Knoll et al. | 710/62 |
| 5,632,016 | * 5/1997 | Hoch et al. | 710/30 |
| 5,640,392 | * 6/1997 | Hayashi | 370/395 |
| 5,768,277 | * 6/1998 | Ohno et al. | 370/475 |
| 5,802,059 | * 9/1998 | Hayashi | 370/429 |
| 5,935,267 | * 8/1999 | Hayakawa | 714/748 |
| 5,978,854 | * 11/1999 | Fujimori et al. | 709/245 |
| 6,006,286 | * 12/1999 | Baker et al. | 710/22 |
| 6,138,165 | * 10/2000 | Nakatsugawa | 709/220 |
| 6,167,454 | * 12/2000 | Nakatsugawa | 370/475 |

* cited by examiner

Primary Examiner—Seema S. Rao
(74) Attorney, Agent, or Firm—Fitzpatrick, Cella, Harper & Scinto

(57) ABSTRACT

A data processing apparatus for performing data communication via a digital interface includes a receiver circuit for receiving reception data and a transmitter circuit for transmitting transaction data corresponding to the reception data. The transaction data includes a source ID representative of a source node and a destination ID representative of a destination node. ID information of the data processing apparatus is controlled by a management control circuit. An ID setting circuit sets the ID information from the management control circuit as the source ID of the transaction data, and sets a source ID included in the reception data as the destination ID of the transaction data.

12 Claims, 8 Drawing Sheets

CSP : CYCLE START PACKET
Iso : Iso COMMUNICATION PACKET
Async : Async COMMUNICATION PACKET

DATA PROCESSING APPARATUS/METHOD AND ELECTRONIC APPARATUS WITH SUCH APPARATUS/METHOD

BACKGROUND OF THE INVENTION

1. Field of the Invention

The present invention relates to a data processing apparatus and method used for data communication with electronic apparatuses capable of transmitting/receiving image data and the like via a digital interface.

2. Related Background Art

Apparatuses and systems capable of processing composite information, not only text information such as document information but also other information such as image and voice information, are widely used because of improved performances of central processing units (CPUs) of computers, hardware running operating systems (OSes) made available to graphics, networks compatible with digitized communication information of large capacity, developments in information compression techniques, and the like.

With developments in such multimedia techniques, it has become possible to transfer various types of data in various formats via one digital interface (digital I/F) by using communication protocols.

It has also become possible to externally control each of a plurality of units constituting an apparatus running on one communication protocol, and to exchange information between each unit and an external unit.

An IEEE (The Institute of Electrical and Electronics Engineers, Inc.) 1394 serial bus has been paid attention among presently used digital I/F. Use of IEEE 1394 serial buses allows to configure a communication system in which a plurality of electronic apparatuses are interconnected by communication control buses capable of transferring both control signals and information signals to thereby exchange these signals between the electronic apparatuses.

Figure 1:
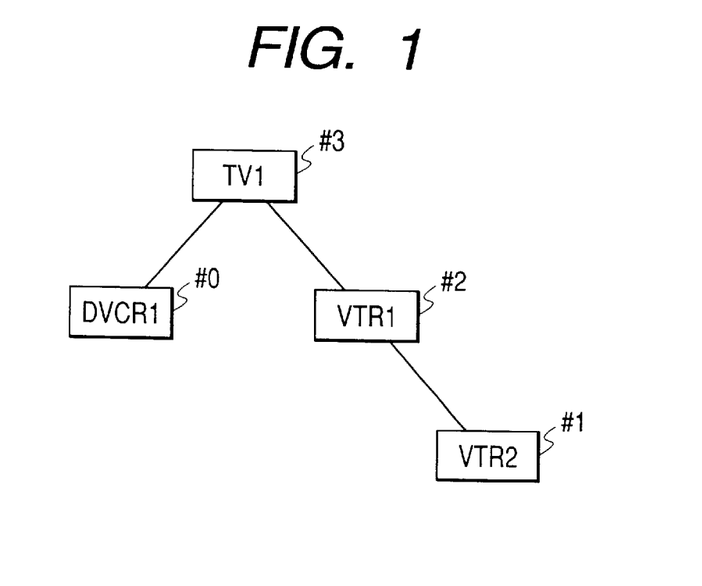
FIG. 1 is a schematic diagram showing an example of a communication system using IEEE 1394 serial buses.

An example of such a system is shown in FIG. 1. This system is constituted of a digital camcorder (hereinafter abbreviated as DVCR 1), a digital television receiver (hereinafter abbreviated as TV 1), and two video tape recorders (hereinafter abbreviated as VTR 1 and VTR 2). IEEE 1394 serial bus cables are used for the connections between DVCR 1 and TV 1, between TV 1 and VTR 1, and between VTR 1 and VTR 2. Each digital apparatus has a function of relaying digital data and control data on 1394 serial buses.

References "#0" to "#3" denote system node IDs of DVCR 1, VTR 2, VTR 1, and TV 1.

Figure 2:
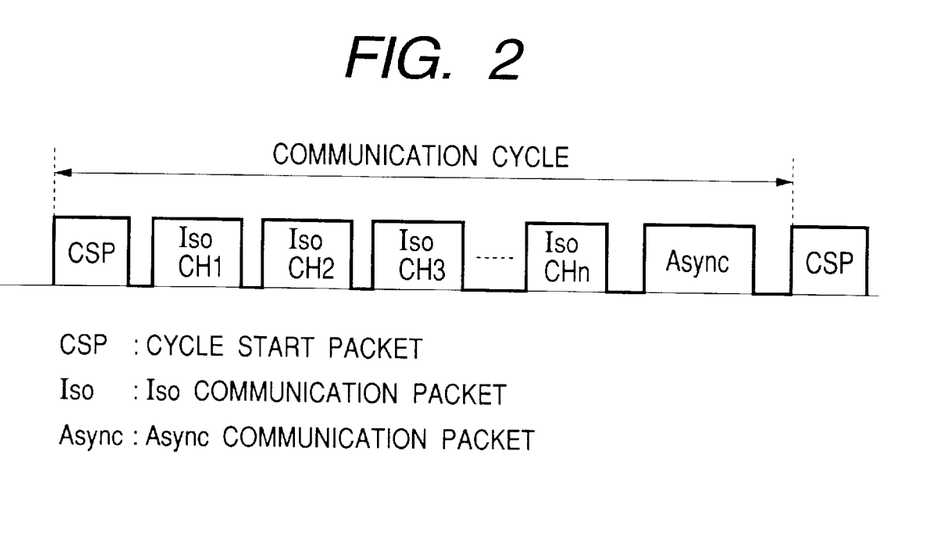
FIG. 2 shows an example of the structure of data on a bus of a communication system using IEEE 1394 serial buses.

Signal transmission by the respective electronic apparatuses (hereinafter simply called apparatuses) of the system is performed in time division multiplex in each predetermined communication cycle (e.g., 125 μsec), as shown in FIG. 2. Signal transmission to each bus starts after an electronic apparatus called a cycle master sends a cycle start packet (CSP) to the bus, this packet indicating a start of a communication cycle.

Two communication types are used in each communication cycle, isochronous (hereinafter abbreviated as Iso) communications and asynchronous (hereinafter abbreviated as Async) communications. Iso communications transfer information signals such as video and audio data through isochronous communications, whereas Async communications transfer information signals through asynchronous communications.

Iso communication packets are transmitted in advance of an Async communication packet. Iso communication packets are assigned channel numbers 1, 2, 3, . . . N to discriminate between a plurality of Iso data. Transmission of the Async communication packet is performed during a period from when all Iso communication packets were transmitted completely and to when the next cycle start packet is transmitted.

A control signal that one apparatus requests something from another apparatus during the Async communication, is called a command. An apparatus which sends a packet containing such a command is called a controller, whereas an apparatus which receives the command is called a target. The target returns, if necessary, a packet containing a control signal (called a response) representative of the execution results of the received command.

These command and response are transferred between one controller and one corresponding target. A set of processes starting from the transmission of a command and terminating at the return of the response, is called a command transaction.

By using the command transaction, each controller can requests the target to execute a specific operation and can inquire the current status of the target. Any of the apparatuses of the system can start and terminate the command transaction. In other words, any apparatus can become a controller or a target.

Figure 3:
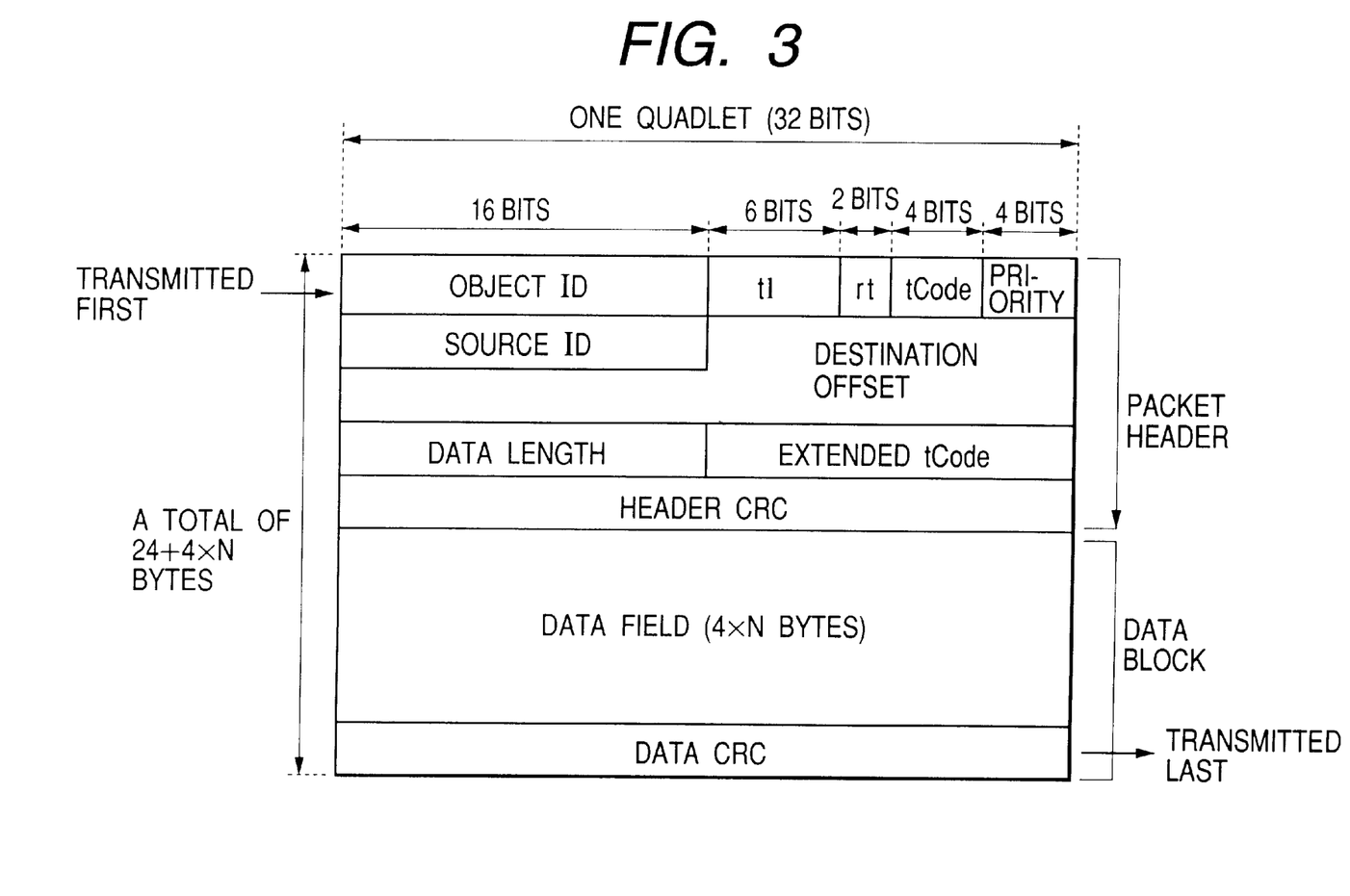
FIG. 3 shows the structure of an Async communication packet.

FIG. 3 shows the structure of an Async communication packet containing a control signal. In FIG. 3, data in the packet is sequentially transmitted from the upper to lower side and from the left to right side.

The Async communication packet is constituted of a packet header and a data block. The whole of the packet header and a data CRC field in the data block has the specifications stipulated by IEEE 1394. The contents of the data block of the packet transmitted from an apparatus identified with a source ID in the packet header are written in a storage unit of an apparatus identified with a destination (object) ID at an address indicated by a destination offset.

For example, in FIG. 1, if TV 1 sends a command to VTR 1, the source ID is #3, the destination ID is #2, and the destination offset is a memory space assigned as an area of VTR 1 in which the command is loaded.

In the above-described communication scheme, it is stipulated that a target returns a response as soon (e.g., in 100 ms or shorter) as possible after the command is received during the command transaction. The reason of this is to prevent a process from being delayed because the controller waits for the response too long, and to prevent a process from being suspended because a response is not returned by some reasons.

SUMMARY OF THE INVENTION

From the above-described background, one object of the present invention is to provide a data processing apparatus/method for performing a transmission/reception process of data communications, capable of reducing a load on a controller circuit, quickly performing a control operation corresponding to the contents of received data, and facilitating data transfer via network paths, and to provide an electronic apparatus with such a data processing apparatus/method.

According to one preferred embodiment of the invention, a data processing apparatus for performing data communications by adding a destination ID representative of a destination node and a source ID representative of a source (local) node of a transmitter, to communication data, is provided which comprises: ID setting means for setting the destination and source IDs to transmission data; and control means for controlling the data processing apparatus in accordance with the contents of reception data, wherein the ID setting means and the control means are provided independently.

According to another preferred embodiment of the invention, an electronic apparatus including a data processing apparatus for performing data communications by adding a destination ID representative of a destination node and a source ID representative of a source node of a transmitter, to communication data, and a control apparatus for controlling the data processing apparatus in accordance with the contents of reception data, is provided with ID setting means for setting the destination and source IDs to transmission data, wherein the control apparatus includes control means for controlling the data processing apparatus in accordance with the contents of reception data.

According to another preferred embodiment of the invention, a data processing method of performing data communications by adding a destination ID representative of a destination node and a source ID representative of a source node of a transmitter, to communication data, is provided, wherein the method comprises the steps of: setting the destination and source IDs to transmission data; and controlling the apparatus in accordance with the contents of reception data, wherein the setting and controlling steps are executed in parallel.

Other objects, features and advantages of the invention will become apparent from the following detailed description taken in conjunction with the accompanying drawings.

DETAILED DESCRIPTION OF THE PREFERRED EMBODIMENTS

Figure 4:
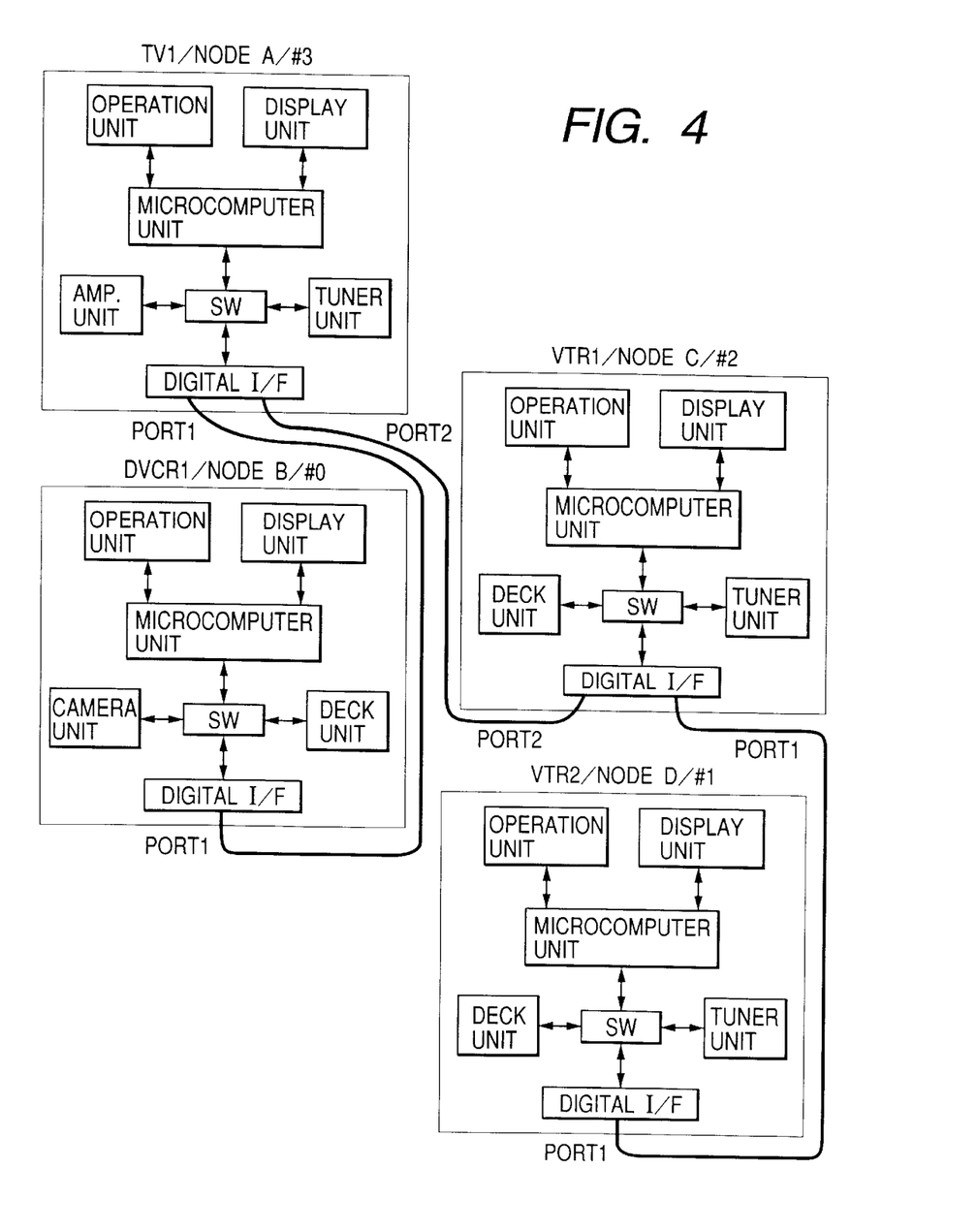
FIG. 4 is a schematic diagram showing the structure of a communication system using IEEE 1394 serial buses according to an embodiment of the invention.

FIG. 4 shows the structure of a communication system using IEEE 1394 serial buses according to an embodiment of the invention.

In FIG. 4, this communication system has various digital apparatuses, for example, two digital video tape recorders (hereinafter abbreviated as VTR 1 and VTR 2), a digital television receiver (hereinafter abbreviated as TV 1), and a digital camcorders (hereinafter abbreviated as DVCR 1).

IEEE 1394 serial bus cables are used for the connections between DVCR 1 and TV 1, between TV 1 and VTR 1, and between VTR 1 and VTR 2. Each digital apparatus has a function of relaying digital data and control data on 1394 serial buses.

Of these digital apparatuses, VTR 1 and VTR 2 have the basic structure constituted of: a deck unit; a tuner unit; an operation unit and a display unit serving as user interfaces; a microcomputer unit for performing the operation control of the apparatus, generating a packet used for communications, and storing addresses; a digital interface (digital I/F) with a 1394 serial bus and a switch unit for switching among the deck unit, tuner unit and digital I/F. TV 1 has a basic structure similar to the basic structure of VTR 1 and VTR 2, with the deck unit being replaced by an amplifier unit. DVCR 1 has a basic structure similar to the basic structure of VTR 1 and VTR 2, with the tuner unit being replaced by a camera unit.

The digital I/F of each digital apparatus is in conformity with the IEEE 1394 serial bus.

Specifically, communications are performed in each predetermined communication cycle (125 ps). Data having a time axis such as video and audio data is transferred through Iso communications which ensure a transfer bandwidth at a certain data rate, whereas control data such as a control command is transferred not periodically when necessary through Async communications.

With Async communications, data is asynchronously transferred. The time sequential data transition states during Async communications are shown in FIG. 5.

Figure 5:
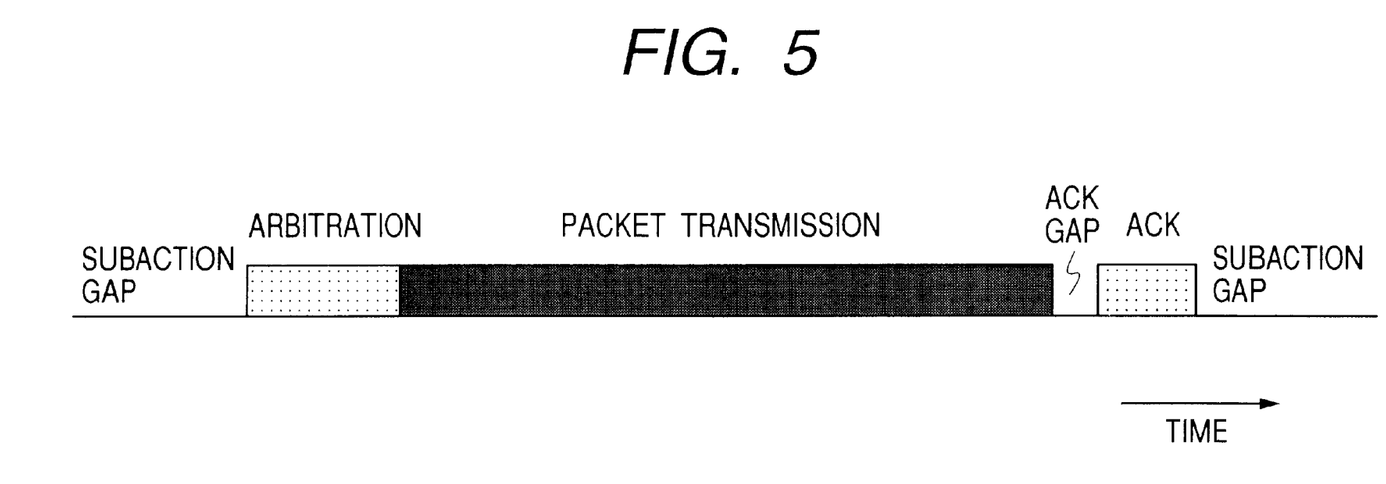
FIG. 5 is a diagram illustrating time sequential data transition states during Async communications.

A first subaction gap shown in FIG. 5 indicates an idle state of the bus. A node which desires to transfer data judges that the bus can be used when the idle time takes a predetermined value, and executes arbitration for acquiring the bus.

After the use permission of the bus is given by the arbitration, data is transferred in the form of packet. After the data is transferred and after a short gap called an ack gap, a node which received the Asynchronous packet returns an acknowledge (ack: reception confirming return code) or response packet, in response to the transferred data. The ack is constituted of four-bit information and four-bit check sum, and contains information representative of a success state, a busy state or a pending state. This ack is immediately returned to the source node.

As shown in FIG. 3, an Async communication packet is constituted of the packet header, a data field and the error checking data CRC. The header is written with information such as a destination ID, a source ID and a transfer data length.

With Async communications, point-to-point communications are performed between a source node and a destination node. Although a packet transferred from a source node reaches each node in the network, each node discards the packet if it has an address not destined to it, so that only the packet destined to the destination node can be read by this node.

With Iso communications, data is transferred isochronously. Iso communications provide a data transfer mode suitable for transferring data in real time, such as moving image data and voice data.

Point-to-point data transfer is performed with the Async communications, whereas data is broadcast with the Iso communications in which a packet is broadcast from one node to all nodes in the network.

Figure 6:
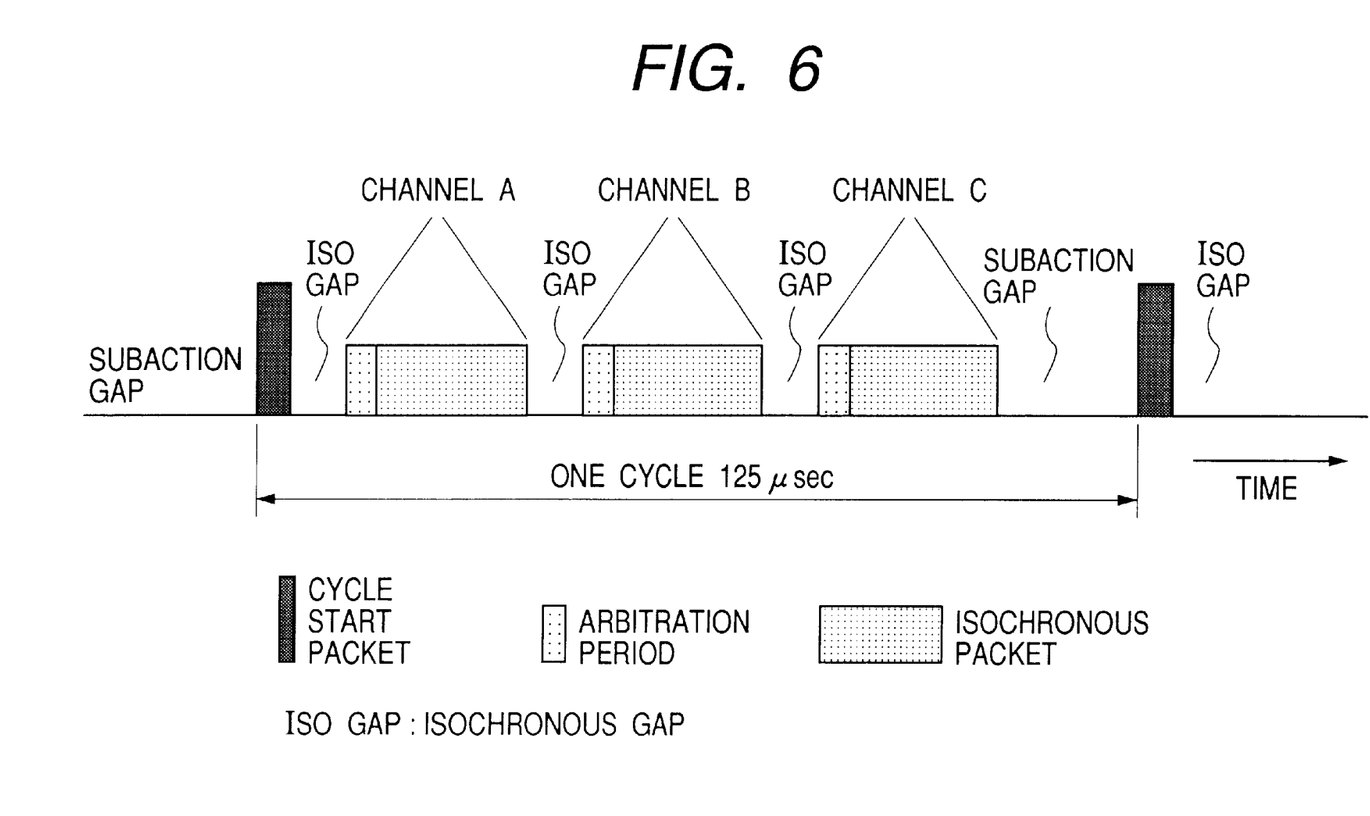
FIG. 6 is a diagram illustrating time sequential data transition states during Iso communications.

FIG. 6 shows the time sequential data transition states during Iso communications.

Isochronous transfer is executed in each predetermined cycle time which is generally set to 125 µs. A cycle start packet indicates the start time of each communication cycle and functions to adjust the time at each node. The cycle start packet is transmitted after a predetermined idle period (subaction gap) after the previous communication cycle. An interval of transmitting cycle start packets corresponds to one communication cycle.

Packets from a plurality of nodes are given different IDs such as channels A, B and C shown in FIG. 6, so that each packet can be transferred in a discriminating way. In this manner, Iso communications can be performed at the same time among a plurality of nodes. This channel ID does not indicate the address of a destination node, but is a logical number assigned to the data. An Isochronous packet is transferred (broadcast) from one source node to all other nodes.

Prior to transmitting an Iso communication packet, arbitration is performed similar to Async communications. However, since Iso communications do not use point-to-point data transfer like Async communications, Iso communications have no ack (reception confirming return code).

An isochronous gap (iso gap) shown in FIG. 6 is an idle period necessary for confirming an idle state of the bus before performing Iso communications. After this preset idle period, a node which desires to perform Iso communications judges that the bus is idle, if this preset idle period lapses, so that arbitration before data transfer becomes possible.

Figure 7:
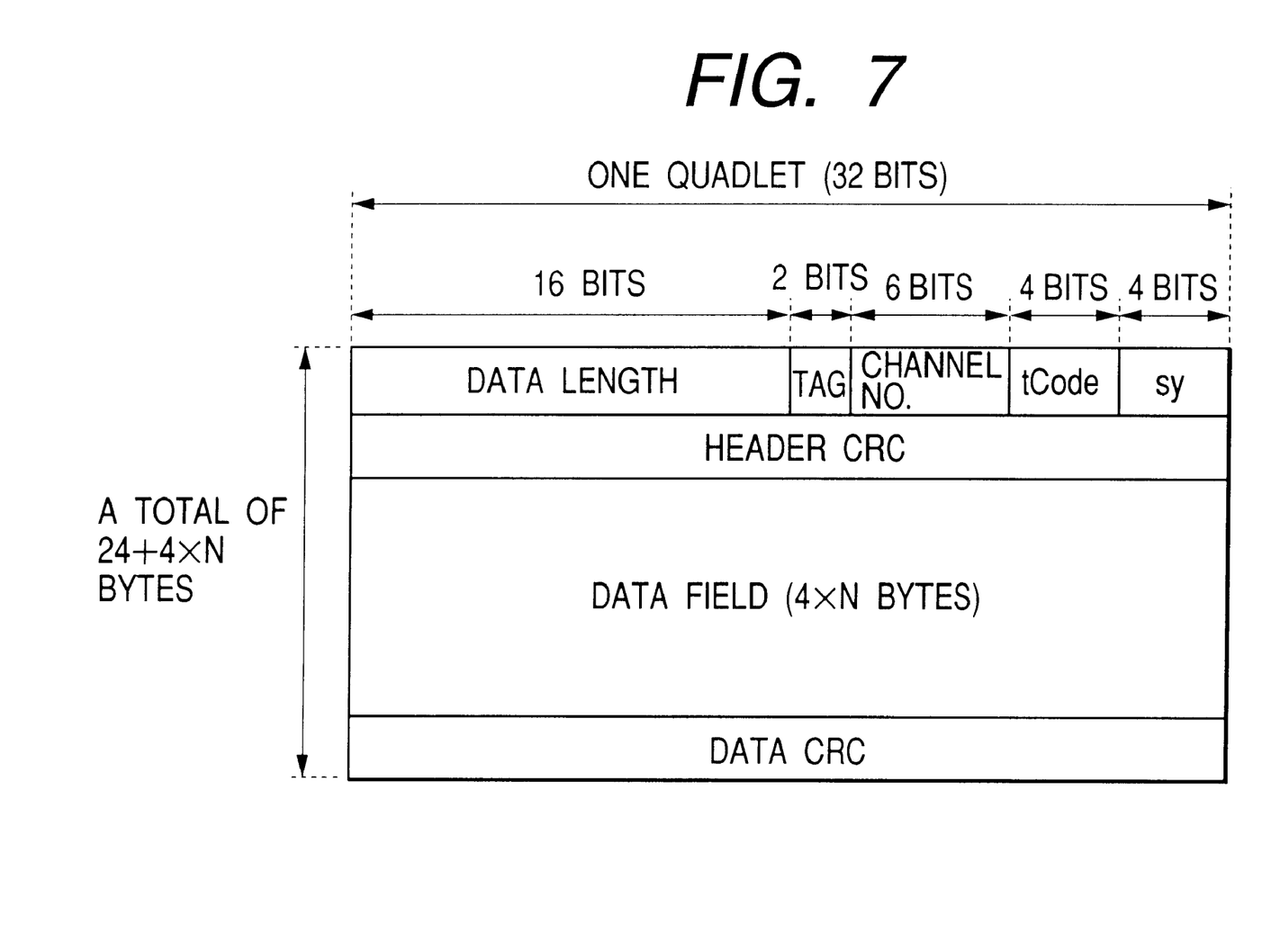
FIG. 7 shows the structure of an Iso communication packet.

The structure of an Iso communication packet is shown in FIG. 7.

As shown in FIG. 7, an isochronous packet is constituted of a header, a header CRC, a data field and a data CRC. The header includes a field for storing data representative of a length of data in the data field, a field for storing data representative of a channel number of the isochronous packet, a field for storing data (transaction code (tCode)) discriminating a packet format and a process to be executed, and other fields.

Both Iso and Async communications can be performed at the same time on the network.

Figure 8:
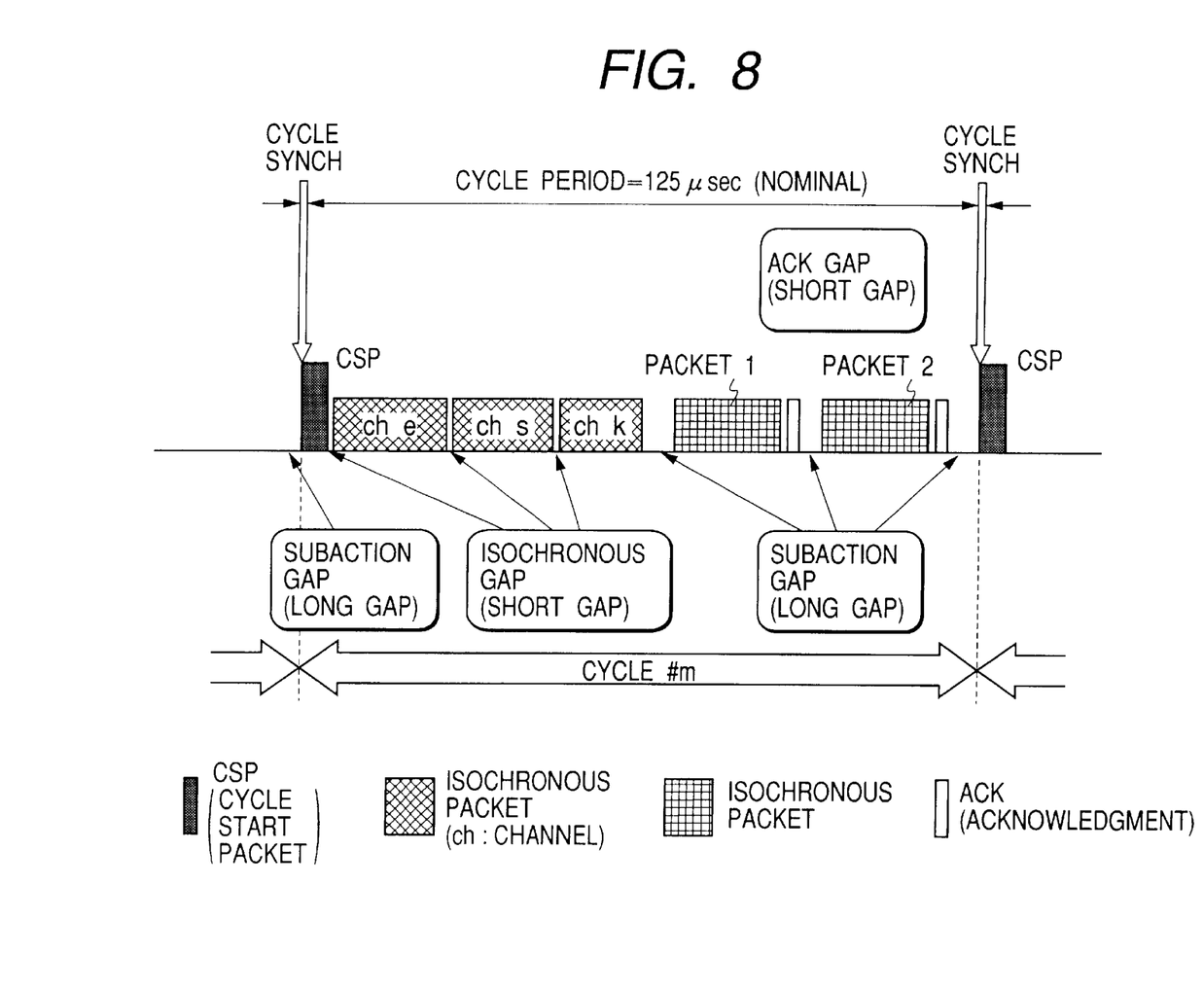
FIG. 8 is a diagram illustrating a mixed transfer state of Iso and Async communications.

FIG. 8 is a diagram illustrating a mixed transfer state of Iso and Async communications.

Iso communications are executed with the priority over Async communications. The reason for this is that Iso communications can be set up with a shorter gap length (isochronous gap) than a gap length (subaction gap) of the idle period required for setting up Async communications. Iso communications are therefore executed with the priority over Async communications.

In a general bus cycle shown in FIG. 8, at the start of a cycle #m, a cycle start packet is transferred to each node so that each node can adjust the time. After a preset idle period (isochronous gap), a node which desires to perform Iso communications, executes arbitration and thereafter transfers an isochronous packet. In the example shown in FIG. 8, Iso communications are performed in the sequential order of channels e, s and k.

After Iso communications are performed by all nodes capable of performing Iso communications, each node is permitted to perform Async communications.

After the idle time lapses by a time corresponding to the subaction gap after which Async communications can be performed, a node which desires to perform Async communications executes arbitration.

Async communications can be performed only when the subaction gap for setting up Async communications is obtained during the period from an end of Iso communications to a time (cycle synch) when the next cycle start packet is transferred.

In the cycle #m shown in FIG. 8, isochronous transfer of three channels and asynchronous transfer (inclusive of ack) of two packets (packet 1 and packet 2) are performed. The transfer period of the cycle #m terminates after the asynchronous packet 2 at the timing (cycle synch) when the next cycle (m+1) starts.

Bus management for making IEEE 1394 serial buses operable will be described.

An apparatus as a bus manager controls bus communications by first grasping the network structure and a connection state of all nodes and then defining each node and controlling Iso communications.

Specifically, in the communication system shown in FIG. 4, system topology is automatically set, when a power is turned on or when a digital apparatus is connected newly or disconnected, by automatically assigning node IDs (physical addresses #0, #1, #2 and #3 shown in FIG. 1) of respective apparatuses (nodes) in accordance with the connection state of the system by using the following procedure based upon an address program and an address table stored in a memory of the microcomputer unit.

This node assigning procedure will be briefly described, the procedure including a process of determining a hierarchical structure of the system and a process of assigning each node with a physical address.

It is assumed that of the digital apparatuses, TV 1 is assigned a node A, DVCR 1 is assigned a node B, VTR 1 is assigned a node C, and VTR 2 is assigned a node D.

Each node notifies a connected partner node via a 1394 serial bus that the partner node is a parent node. A node first notified has a priority over another node second notified. In this manner, a parent-child relationship of nodes of the system is finally determined, i.e., a system hierarchical structure and a root node which is not a child of any other nodes are determined.

More specifically, it is assumed that: the node D notifies the node C that the node C is a parent of the node D; the node B notifies the node A that the node A is a parent of the node B; the node A notifies the node C that the node C is a parent of the node A; and the node C notifies the node A that the node A is a parent of the node C. In this case, a node first notified has a priority over another node second notified. If a notice by the node C is earlier than the notice by the node A, the node A is made a parent of the node C and becomes a root node which is not a child of any other nodes.

After the parent-child relationship of the digital apparatuses is determined in the above manner, physical addresses are assigned. In assigning physical addresses, basically the parent node allows a child node to assign an address, and each child node allows its children nodes to assign addresses in the order from a smaller port number.

If the parent-child relationship of the example shown in FIG. 4 is determined as above, the node A first allows the node B to assign an address so that the node B assigns itself with a physical address #0. This address assignment is transmitted to the buses to notify the other nodes of that "the physical address #0 was already assigned".

Next, as the node A allows the node C to assign an address, the node C allows its child node D to assign an address. Therefore, the node D assigns itself with a physical address #1 next to the address #0, and this assignment is transmitted to the buses.

Thereafter, the node C assigns itself with a physical address #2 and this assignment is transmitted to the buses. Lastly, the node A assigns itself with a physical address #3 and this assignment is transmitted to the buses.

Next, a data transfer procedure will be described. Data transfer becomes possible after the above-described physical addresses are assigned. In an IEEE 1394 serial bus system, arbitration of bus use privilege is performed by the root node prior to data transfer.

Each node which desires to perform data transfer requests its parent node for a bus use privilege. The root node arbitrates bus use privilege requests from respective nodes. A node given a bus use privilege designates a transfer rate prior to data transfer, and notifies the destination node of the transfer rate such as 100 Mbps, 200 Mbps and 400 Mbps.

In the case of Iso communications, immediately after a cycle start packet which was transmitted synchronously with the communication cycle from the root node as the cycle master, the source node starts data transfer in a designated channel.

The cycle master transmits the cycle start packet to the bus and also adjusts the time at each node.

In the case of Async communications for the transfer of control data such as a command, arbitration for Async communications is performed after isochronous transfer in each communication cycle, and data transfer from the source node to the destination node starts.

Figure 9:
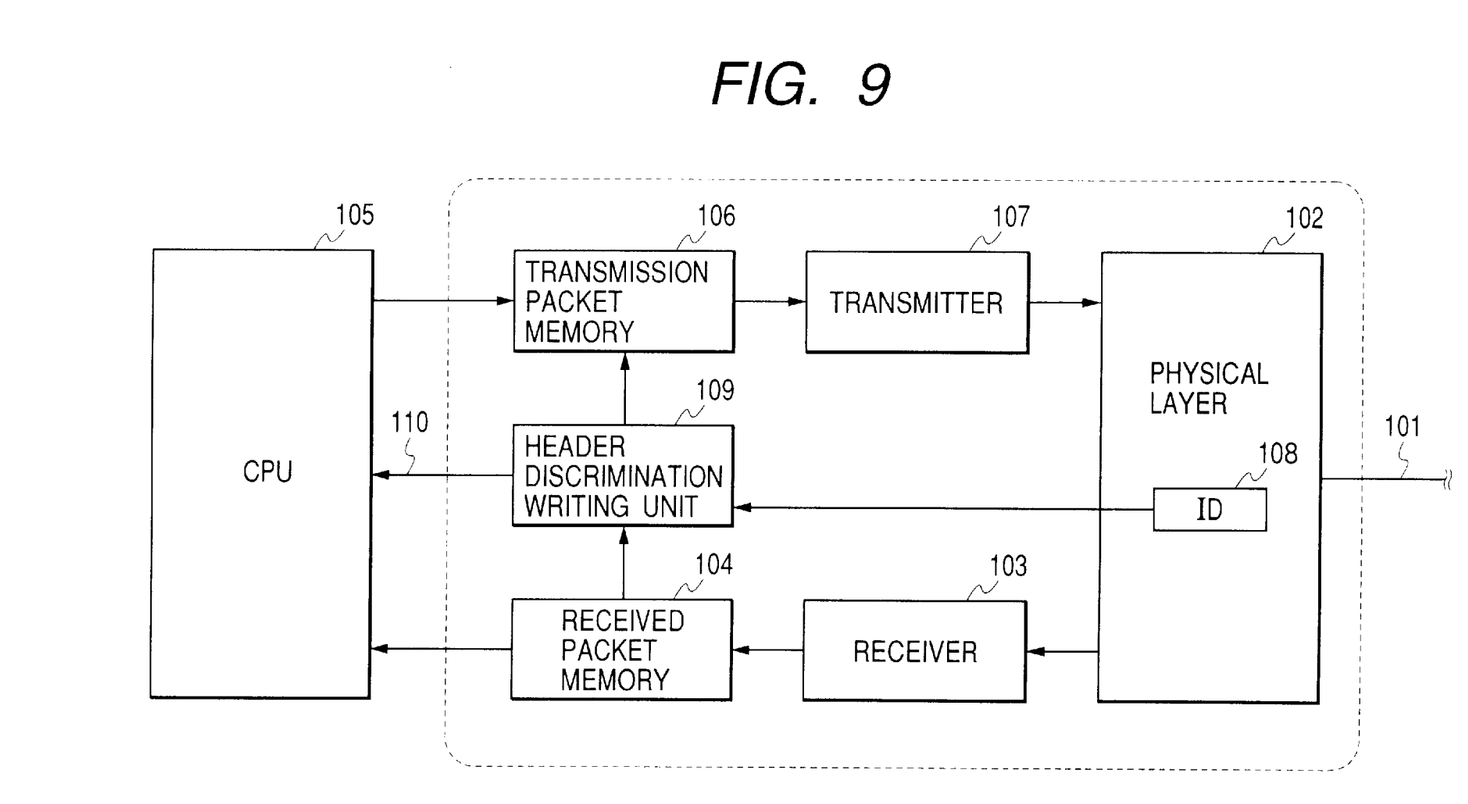
FIG. 9 is a schematic diagram showing the structure of a packet data processing apparatus of a data processing apparatus equipped with a digital apparatus, the packet data processing apparatus transmitting/receiving packet data via a digital I/F.

FIG. 9 shows a packet data processing apparatus provided in each digital apparatus shown in FIG. 4, the packet data processing apparatus transmitting/receiving packet data via a digital I/F.

Referring to FIG. 9, a packet received from a cable 101 of IEEE 1394 serial bus via a physical layer 102 and a receiver, is temporarily stored in a reception packet memory 104. A process controlling CPU 105 externally connected to the packet data processing apparatus surrounded with a broken line in FIG. 9 reads a header and data in a reception packet from the reception packet memory 104, and in accordance with the contents of read data, performs a control process. The process controlling CPU 105 also judges, from the contents of a transaction written in the header, whether a response packet is to be transmitted or not.

If a response packet is required to be transmitted, the process controlling CPU 105 writes a header and data of a response transaction in a transmission packet memory 106. A source ID in the reception packet header is read from the reception packet memory 104, and the read ID is written in the transmission packet memory 106 as the destination ID. An ID of the node determined by the physical layer 102 by the above-described procedure is written in the transmission packet memory 106 as the source ID.

The response packet stored in the transmission packet memory 106 is thereafter transmitted to the cable 101 via a transmitter 107 and physical layer 102.

The processes to be executed by a header discrimination writing unit 109 will be described.

The header discrimination writing unit 109 reads a header of an externally received packet from the reception packet memory 104 to judge whether the packet requires that a response is to be returned. For example, if the type of the transaction of a received packet is a data read request or the like, it is necessary to return a response packet containing requested data.

The type of a transaction can be identified, for example in the case of the IEEE 1394 specification described earlier, by referring to a transaction code written in the header.

If it is judged that the packet requires to return a response, the header discrimination writing unit 109 writes the source ID written in the header of the received packet in the transmission packet memory 106 as the destination ID to which the response packet is returned. At the same time, the physical ID of the node set to a physical ID register 108 is written in the transmission packet memory 106 as the physical ID of the node. The process controlling CPU 105 connected via a signal line 110 is notified of that the destination ID has been set to the transmission packet memory 106.

As above, the header discrimination writing unit 109 dedicated to writing destination and source IDs in the transmission packet memory 106 is provided independently from the process controlling CPU 105. Therefore, the process controlling CPU 105 externally connected to the data processing apparatus is not required to perform a process of writing the destination and source IDs in the transmission packet memory 106, and can be dedicated only to performing the control process in accordance with the contents of received data. A load of the process controlling CPU 105 can therefore be lowered, a processing speed can be improved, and a response can be performed quickly.

In the above embodiment, a relationship between a request and a response of the IEEE 1394 specification is used when a response packet is returned to a source node from which a packet was transmitted. If a command and a response is stipulated by an upper level protocol of the IEEE 1394 specification, the upper layer may judge whether or not a received packet is a command packet requiring a response.

For example, a household AV apparatus protocol is known as the upper layer protocol of the IEEE 1394 specification. With this protocol, as a command is transferred between AV apparatuses by using a write transaction of the IEEE 1394 specification, response data is returned by using the write transaction. In this case, the processes similar to the above-described embodiment may be performed by judging from the data field of a received packet that the packet is a command packet of the household AV apparatus protocol.

Also in the above embodiment, although an IEEE 1394 serial bus system has been described by way of example, the invention is not limited only to such a system. For example, the invention is also applicable to a communication system if it can perform data transfer by specifically assigning a plurality of apparatuses with node IDs. A data communication method is not limited only to packet exchange communications.

In other words, the foregoing description of embodiments has been given for illustrative purposes only and not to be construed as imposing any limitation in every respect.

The scope of the invention is, therefore, to be determined solely by the following claims and not limited by the text of the specifications, and alterations made within a scope equivalent to the scope of the claims fall within the true spirit and scope of the invention.

What is claimed is:

1. A data communication apparatus comprising:
   an ID information management unit adapted to manage ID information of the apparatus, the ID information management unit automatically setting the ID information when a topology of a communication system is determined;
   a receiver unit adapted to receive a first packet, the first packet including a source ID representing a source node and a destination ID representing a destination node;

a header generation unit adapted to generate a header of a second packet corresponding to the first packet, the header generation unit setting the ID information provided from the ID information management unit as a source ID of the second packet and setting the source ID of the first packet as a destination ID of the second packet; and a transmission unit adapted to transmit the second packet.

2. An apparatus according to claim 1, wherein the first packet includes command data and the second packet includes response data corresponding to the command data.

3. An apparatus according to claim 2, wherein the first packet is transacted by a write transaction in accordance with an IEEE 1394 standard.

4. An apparatus according to claim 1, wherein the first and second packets are transferred by an asynchronous transfer mode in accordance with an IEEE 1394 standard.

5. An apparatus according to claim 1, wherein the apparatus is a digital television.

6. An apparatus according to claim 1, wherein the apparatus is a digital video recorder.

7. A method of controlling a data communication apparatus, the method comprising:

a management step of managing ID information of the apparatus, the managing step automatically setting the ID information when a topology of a communication system is determined;

a reception step of receiving a first packet, the first packet including a source ID representing a source node and a destination ID representing a destination node;

a header generation step of generating a header of a second packet corresponding to the first packet, the header generation step setting the ID information managed in the management step as a source ID of the second packet and setting the source ID of the first packet as a destination ID of the second packet; and a transmission step of transmitting the second packet.

8. A method according to claim 7, wherein the first packet includes command data and the second packet includes response data corresponding to the command data.

9. A method according to claim 8, wherein the first packet is transacted by a write transaction in accordance with an IEEE 1394 standard.

10. A method according to claim 7, wherein the first and second packets are transferred by an asynchronous transfer mode in accordance with an IEEE 1394 standard.

11. A method according to claim 7, wherein the apparatus is a digital television.

12. A method according to claim 7, wherein the apparatus is a digital video recorder.

* * * * *

UNITED STATES PATENT AND TRADEMARK OFFICE
CERTIFICATE OF CORRECTION

PATENT NO.    : 6,272,114 B1
DATED         : August 7, 2001
INVENTOR(S)   : Takashi Kobayashi Page 1 of 1

It is certified that error appears in the above-identified patent and that said Letters Patent is hereby corrected as shown below:

<u>Column 2,</u>
Line 23, "requests" should read -- request --.
Line 51, "by" should read -- for --.

<u>Column 4,</u>
Line 25, "(125 ps)." should read -- (125 µs) --.
Line 29, "when" should read -- but when --.
Line 40, "of" should read -- of a --.

Signed and Sealed this

Twenty-sixth Day of March, 2002

Attest:

JAMES E. ROGAN
*Attesting Officer*     *Director of the United States Patent and Trademark Office*